ELECTRIC MOTOR
Filed Dec. 31, 1931
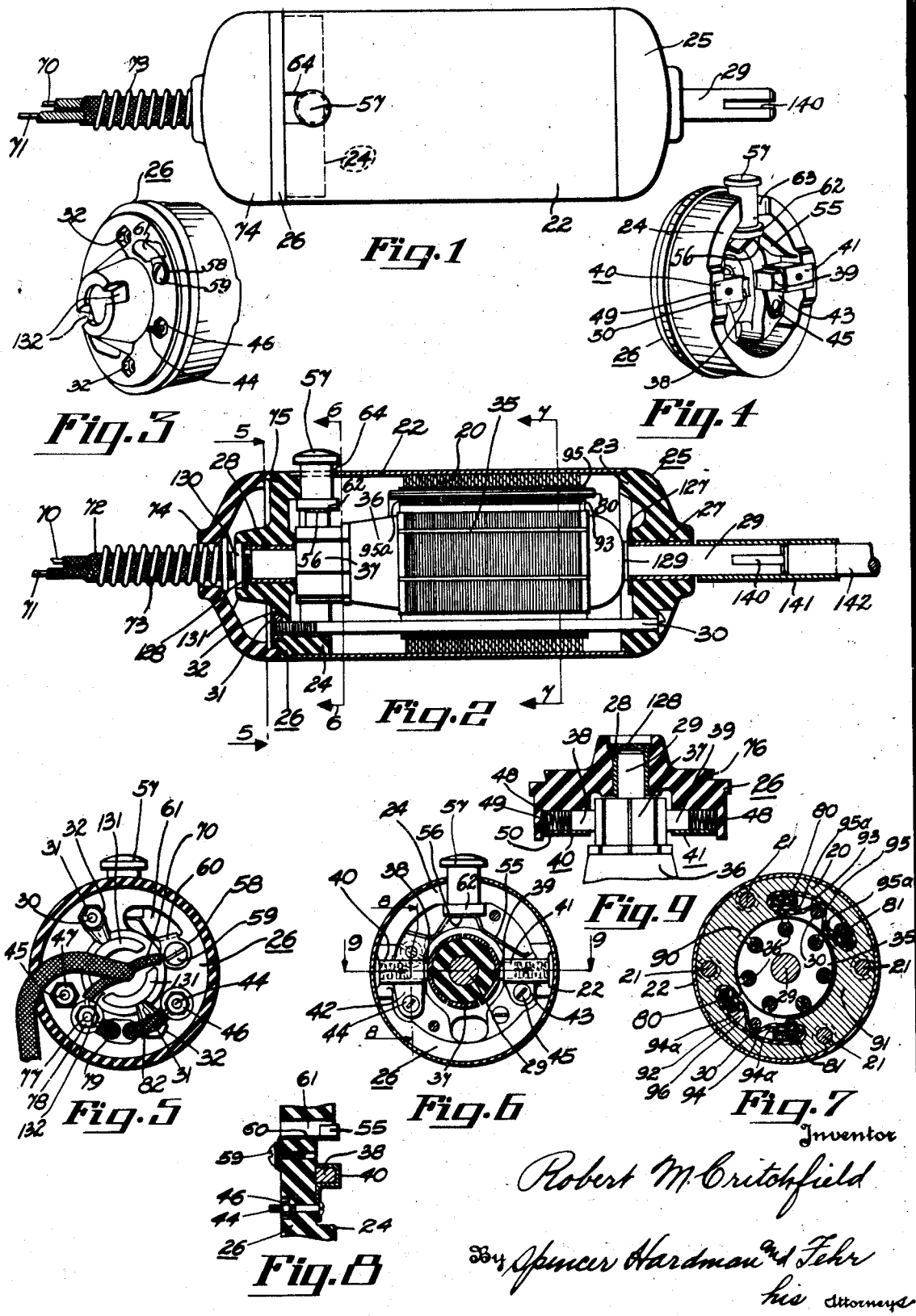

UNITED STATES PATENT OFFICE 1,956,373

ELECTRIC MOTOR

Robert M. Critchfield, Anderson, Ind., assignor, by mesne assignments, to General Motors Corporation, Detroit, Mich., a corporation of Delaware Application December 31, 1931, Serial No. 584,053

6 Claims. (Cl. 172—36)

This invention relates to an electric motor and more particularly to small portable electric motors which are adapted to be held manually while operating small utensils such as ink erasers, drink mixers and the like. It is one of the objects of the invention to simplify the construction of electric motors of this type in order to reduce the cost of manufacture, and to provide a small electric motor of simple and economic construction and which may be controlled in an easy manner. This object is accomplished particularly by providing an electric motor having a metal field magnet housing closed by nonconducting end members which provide bearings for the motor shaft. One of these bearing members provides terminal or binding posts to which the line wires are attached, which wires pass through a nonconducting cap fitted to this nonconducting end member by inter-fitting snap-on flanges. This same nonconducting end member carries a switch of unique construction by which the motor circuit is controlled. The switch comprises a leaf spring member making contact with one of the two metallic brush holders carried by the member. The switch blade is operated by a button retained by the end member and the field magnet housing.

Further objects and advantages of the present invention will be apparent from the following description, reference being had to the accompanying drawing, wherein a preferred embodiment of one form of the present invention is clearly shown.

In the drawing:

Fig. 1 is a plan view of an electric motor embodying the present invention.

Fig. 2 is a longitudinal sectional view thereof.

Figs. 3 and 4 are perspective left hand and right hand views of the nonconducting end member which carries the binding posts, the brush holders and the motor controlling switch.

Figs. 5, 6 and 7 are sectional views taken respectively on lines 5—5, 6—6 and 7—7 of Fig. 2.

Figs. 8 and 9 are fragmentary sectional views taken on lines 8—8 and 9—9 of Fig. 6.

Referring to Figs. 2 and 7 numeral 20 designates a laminated field magnet core the laminæ being held together by rivets 21. The field core 21 is press-fitted into a field magnet housing or tubular case 22, the ends of which telescopically engage flanges 23 and 24 of nonconducting end frames 25 and 26, respectively, which carry bearings 27 and 28, respectively, for a shaft 29. The end frames 25 and 26 are maintained assembled with the shell 22 by two through bolts 30 which cooperate with nuts 31 each nut being hexagonal and being received by a hexagonal socket 32 provided in the outer surface of the frame 26 as shown in Fig. 3.

The shaft 29 carries an armature core 35 carrying windings 36 attached to commutator segments 37 in the proper manner. The commutator 37 is engaged by brushes 38 and 39 slidable in metallic channel shaped brush holders 40 and 41, respectively, provided with ears 42 and 43, respectively, secured by screws 44 and 45, respectively, and cooperating nuts 46 and 47, respectively, to the frame 26. Each brush is urged by a spring 48 toward the commutator, the outer end of each spring bearing against a wall of the cylindrical flange portion 24 which defines a notch 49 into which fits a tang 50 integral with the brush holder 40 or 41. The brush holder 41 provides a switch contact engageable with a phosphor bronze leaf spring conductor 55 having an intermediate hump portion 56 engageable with an operating button 57 and having an eye portion 58 secured by a screw 59 to the end frame 26. The part 60 which joins the eye portion 58 with the resilient portion of the blade 55 extends through an opening 61 in the end frame 26. The button 57 is urged outwardly by the spring 55 until its flange 62 engages the under side of the flange 24 of the end frame 26. The shank of the button 57 is received by a notch 63 in the flange 24, and the button 57 is retained in this notch by the end wall portion of a notch 64 provided by the shell 22. When the shell is assembled with the end frame 26, the button 57 will be retained in position. Inward movement of the button 57 is limited by its head striking the outer surface of the shell 22.

The line wires 70 and 71 encased within a sheath 72 and protected by a coiled wire 73 pass through a cap 74 having annular flange 75 which cooperates with an annular flange 76 provided by the end frame 26 (see Fig. 9). These flanges 75 and 76 are provided with mating re-entrant conical surfaces constructed and arranged to provide a snap-on fit between the cap 74 and the end frame 26. Before the cap 74 is snapped onto the frame 26, one of the wires such as wire 70 is attached by screw 59 to the switch blade eye 58 and the other wire 71 is attached by a screw 77 and a nut 78 to a wire 79 leading to the two field coils 80 and 81 shown in section of Fig. 7. The other lead 82 of the field coils is attached by nut 46 and screw 44 to the brush holder 40. By pushing the button 57 the motor circuit is completed as follows: wire 70, holder 41, brush 39, commutator 37, armature windings 36, commutator 37, brush 38, brush holder 40, screw 44, wire 82, field windings 81 and 80, wire 79, terminal screw 77 and the line wire 71. The motor circuit is interrupted by releasing the button 57 whereupon it will spring outwardly due to the action of the spring conductor 55 which separates itself from the brush holder 41.

The field windings 80 and 81 surround the polar projections 90 and 91 respectively of the field frame 20. Previous to assembling the windings with the field frame, the notches 92 and 93 defining these polar projections are lined with sheet insulating lining members 94 and 95, the end portions 94a and 95a of which are reversely bent and are held against the sides of the windings 80 and 81 by strips 96 the end portions of which lie under the tips of the polar projections 90 and 91, and the intermediate portions of which are V-shaped and partly embrace the through bolts 30.

The bearings 27 and 28 are made preferably of self lubricating porous bronze so as to require but little oiling. A fiber washer 127 is located between the bearing 27 and a shoulder 129 on shaft 29 so as to hinder the progress of oil from the shaft to the armature windings 36. The opening in the end frame 26 provided for the bearing 28 is closed by a fiber disc 128 which hinders the progress of oil from the bearing 28 to the left. The recess 130 which receives the disc 128 is defined by interrupted annular flanges 131 separated by notches 132 which receive the wires 70 and 71 and assist in holding them in position.

The right hand end of shaft 29 is split at 140 to provide a frictional driving clip fit with a sleeve 141 secured to a rod 142 carrying a utensil not shown.

While the form of embodiment of the present invention as herein disclosed, constitutes a preferred form, it is to be understood that other forms might be adopted, all coming within the scope of the claims which follow.

What is claimed is as follows:

1. An electric motor comprising, in combination, a field magnet core carrying field windings, a tubular shell enclosing the core, end frames attached to the shell and providing bearings, a shaft journalled in said bearings and carrying an armature and a commutator, the end frame adjacent the commutator being molded of non-conducting material, brush holders carried by the end frame on the inside thereof, a switch blade attached to said frame and having a portion located on the inside thereof and engageable with a brush holder but normally out of contact therewith, a button for operating the switch blade, means for retaining the button and comprising mating, notched, telescopically engageable portions of the shell and non-conducting end frame, terminals on the outside of the non-conducting end frame and connected with the field windings, a brush holder and the switch blade, and a cover for the terminals provided with a hole through which line wires may pass.

2. In an electric motor, the combination comprising, a tubular case member, and a sub-assembly including a non-conducting end frame having a flange thereon for telescopically engaging the case member, brush holder secured to the frame, a resilient leaf conducting member also secured to the frame and normally biased away from one of the brush holders, and means for manually effecting engagement of said conducting member and said one of the brush holders.

3. In an electric motor, the combination comprising, a tubular case member having a notch therein, and a sub-assembly including a non-conducting end frame having a flange thereon for telescopically engaging the case member and a notch in said flange for cooperating with the notch in the case member to form an opening, brush holders secured to the frame, a resilient leaf conducting member also secured to the frame and normally biased away from one of the brush holders, and an operating button extending thru the opening formed by said notches and adapted to effect engagement of the conducting member with the said one brush holder.

4. In an electric motor having a rotor mounted on a shaft, a stator, bearings for supporting the shaft, brushes, and a manually operable switching means including a normally biased leaf member adapted to engage one of the brush holders to close the circuit thereto, a housing and support assembly comprising in combination, a tubular case member surrounding the stator, a non-conducting end frame member having a flange for telescopically engaging one end of the case member and a bearing supported thereby, said end frame member forming one end cover for the motor, a non-conducting frame member having flanges thereon, one of which flanges is adapted to telescopically engage the other end of the case member and also having brush holders and switching means secured thereto in cooperative relation as well as having a bearing supported thereby, a cap having a flange portion for telescopically engaging the other flange of said frame, and forming another end cover for the motor, and through bolts for holding the frame members in place.

5. In a portable hand controlled electric motor having a housing with an opening therein, the combination comprising, a resilient leaf conducting member insulatingly anchored at one end to said housing, means for making electrical connection to the leaf conducting member, a brush holder adapted to be engaged by the free end of the conducting member, said conducting member being normally biased away from the brush holder, and an operating member projecting through said opening in the housing for effecting engagement of the conducting member and brush holder to make electrical connection to the brush holder.

6. In an electric motor, a cylindrical shell adapted to be held in the hand, a stationary field magnet mounted within said shell, an armature mounted within said field magnet, bearing members mounted within said shell on opposite sides of said field magnet and rotatably supporting said armature, one of said bearing members being formed of insulating material and being provided with diametrically opposite brush-guides of conducting material, a commutator rotatable with said armature in the plane of said brush-guides, brushes respectively carried by said brush-guides, a switch for controlling the supply of current to the motor and comprising a movable member movable into and out of contact with one of said brush-guides, and a switch-operating member mounted for radial sliding movement in said bearing member and projecting outwardly through said shell in position to be depressed to force said switch member into contact with its associated brush-guide.

ROBERT M. CRITCHFIELD.